(12) United States Patent
Funakawa

(10) Patent No.: US 12,105,879 B2
(45) Date of Patent: Oct. 1, 2024

(54) OPERATION INPUT DEVICE AND IMAGE FORMING DEVICE

(71) Applicant: KONICA MINOLTA, INC., Tokyo (JP)

(72) Inventor: Hisataka Funakawa, Hachioji (JP)

(73) Assignee: KONICA MINOLTA, INC., Tokyo (JP)

(*) Notice: Subject to any disclaimer, the term of this patent is extended or adjusted under 35 U.S.C. 154(b) by 71 days.

(21) Appl. No.: 17/699,325

(22) Filed: Mar. 21, 2022

(65) Prior Publication Data
US 2022/0357797 A1   Nov. 10, 2022

(30) Foreign Application Priority Data

May 7, 2021  (JP) ................................ 2021-079007

(51) Int. Cl.
*G06F 3/01* (2006.01)
*G06F 3/041* (2006.01)
*H04N 1/00* (2006.01)

(52) U.S. Cl.
CPC ............ *G06F 3/016* (2013.01); *G06F 3/0412* (2013.01); *H04N 1/00392* (2013.01); *H04N 1/00496* (2013.01)

(58) Field of Classification Search
None
See application file for complete search history.

(56) References Cited

U.S. PATENT DOCUMENTS

2016/0034887 A1* 2/2016 Lee .......................... G09G 5/12
705/39
2020/0145545 A1 5/2020 Funakawa

FOREIGN PATENT DOCUMENTS

JP 2020071836 A 5/2020
KR 20110029437 A * 3/2011

OTHER PUBLICATIONS

Translation of KR-20110029437-A into English; Lee et al. (Year: 2011).*

* cited by examiner

*Primary Examiner* — Brian M Butcher
(74) *Attorney, Agent, or Firm* — Holtz, Holtz & Volek PC

(57) ABSTRACT

A purpose of the present invention is to obtain a good tactile sensation of a vibration response even if a state or an operation situation of an operation panel changes, when the operation panel installed in a stationary machine, such as an image forming device, is vibrated as an operation response. The present invention is applied to an operation input device that notifies a user by causing a vibrating element to vibrate an operation panel attached to a device main body when an operation of the operation panel by the user is detected. Here, in order to drive the vibrating element, at least one of a plurality of vibration directions is selected to drive the vibrating element when an operation input from the operation panel is detected.

12 Claims, 13 Drawing Sheets

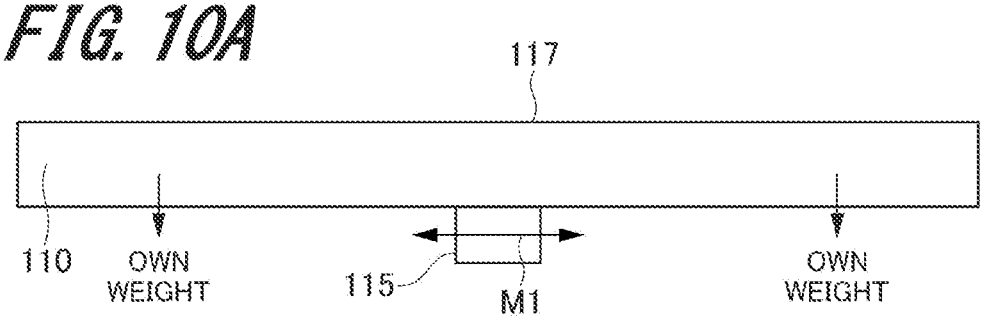
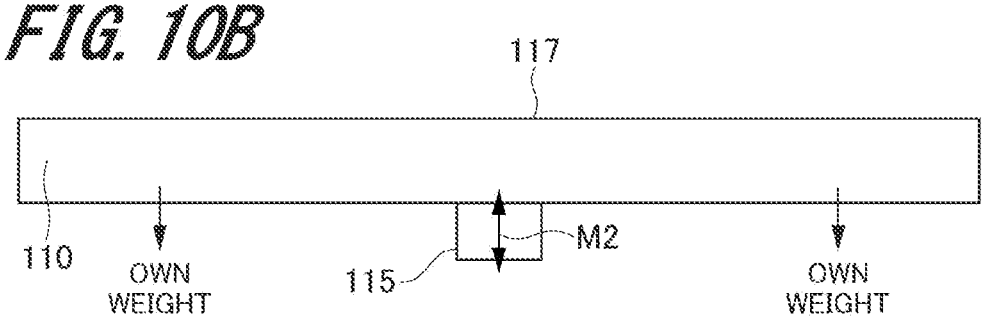

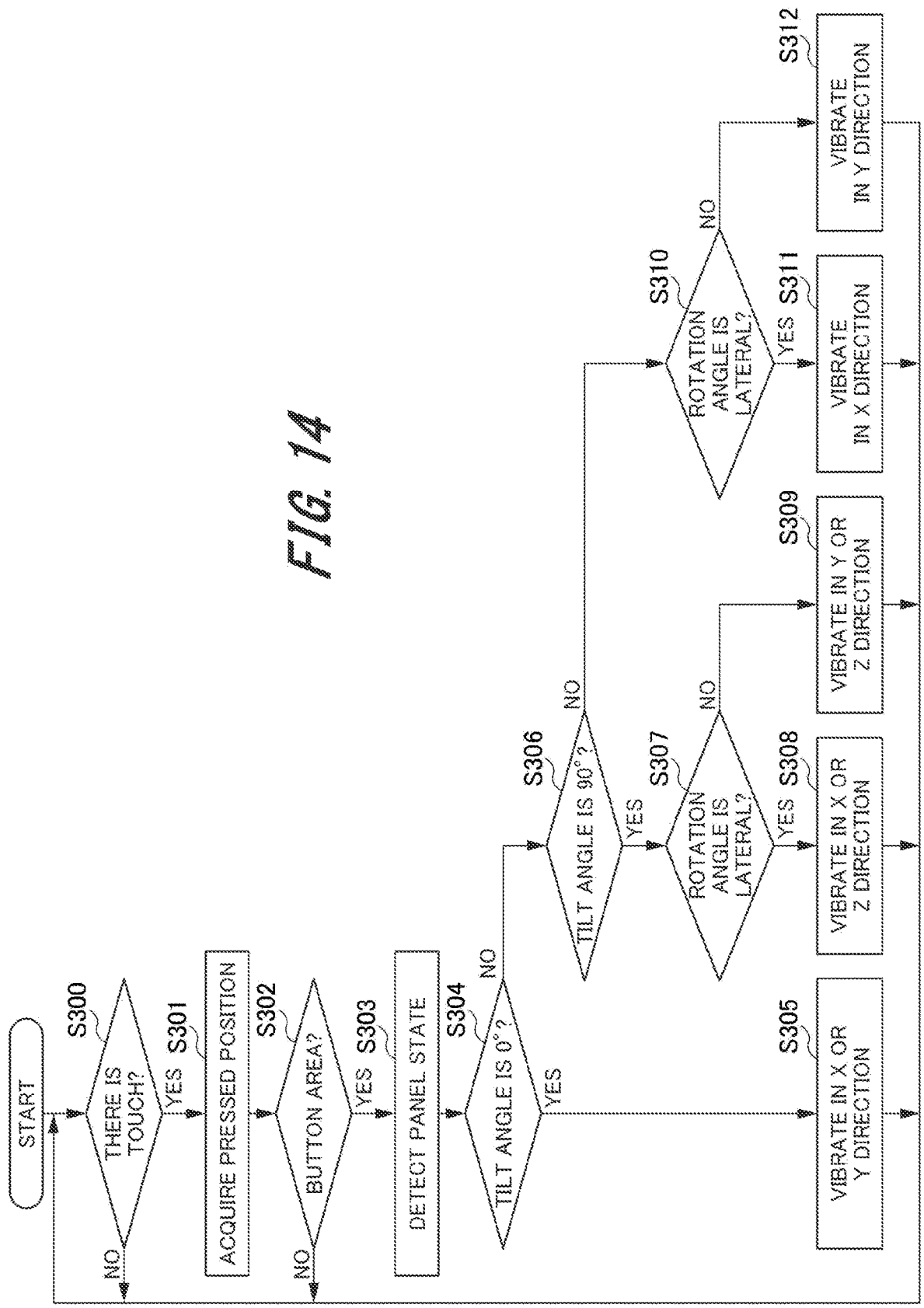

OPERATION INPUT DEVICE AND IMAGE FORMING DEVICE

CROSS-REFERENCE TO RELATED APPLICATIONS

The entire disclosure of Japanese patent Application No. 2021-79007, filed on May 7, 2021, is incorporated herein by reference in its entirety.

BACKGROUND

Technological Field

The present invention relates to an operation input device and an image forming device, and particularly relates to a technique for vibrating operation panel units of the devices.

Description of the Related Art

Various mobile terminals, such as smartphones, that perform notification by vibration as a response to an operation on a touch panel or the like have been practically used. That is, a vibrating element called a vibrator is built in a mobile terminal, and the vibrating element vibrates the mobile terminal for a preset time as a response when a touch on a touch panel is detected to perform, by vibration, an operation response to a user holding the mobile terminal.

In the case of a mobile terminal, such as a smartphone, the user holds the mobile terminal during operation, and vibration by the vibrating element is directly transmitted to the hand. Thus, the position to be vibrated by the vibrating element only needs to evenly transmit the vibration to the hand holding the terminal regardless of the pressed position on the touch panel, and the back surface of the terminal vibrates strongly in general.

Patent Literature 1 discloses a technique for a tactile sensation presenting device including a touch panel that presents a tactile sensation at a plurality of levels to a user by changing a presented tactile sensation according to a position where the user touches on the panel.

RELATED ART LITERATURE

Patent Literature

Patent Literature 1: JP 2020-71836 A

SUMMARY

As disclosed in Patent Literature 1, it has been proposed that an operation panel, such as a touch panel, is caused to respond by vibration when operated even in the case of a stationary machine, such as a digital multifunction peripheral.

In the case of a stationary machine, while an operator operates the operation panel, only the fingertip touches the device, and the operation panel itself is held by the stationary machine.

In order to transmit vibration to the fingertip of the operator in the case of the stationary machine, it is necessary to vibrate the operation panel. However, the operation panel of a stationary machine is often large, and the operation area where the operation panel is touched can be any area on the panel. On the other hand, since the arrangement position of a vibrating element is determined at a specific position for each device, the vibration as a response transmitted to an operator's finger is strong or weak depending on the area where the operation panel is touched. For this reason, depending on the position where the operator touches the operation panel, the operator cannot properly feel the vibration response.

Here, Patent Literature 1 discloses a technique of giving substantially uniform vibration to each part of the operation panel of the device as the amount of vibration set and corrected based on the installation position of the vibrating element, when the operation panel is vibrated by the vibrating element.

However, when vibration as a response is given to a fingertip, the sensation that an operator feels is different from individual to individual depending on the difference in how the operator's fingertip feels, how the operator touches the operation panel with the fingertip, and the like. Thus, even if the same vibration is always given, some operators cannot feel that there is a vibration response.

In recent years, in order to improve the operability of a digital multifunction peripheral, the installation angle of an operation panel can be changed or the vertical and horizontal orientations of the operation panel can be freely rotated. Here, if the vibration direction of a vibrating element is a single direction, the vibration direction changes when the angle or orientation of the operation panel is changed, and the tactile sensation or intensity of the vibration that the operator feels at the time of operating the touch panel is changed.

A purpose of the present invention is to provide an operation input device and an image forming device that are capable of obtaining a good tactile sensation of a vibration response even if a state or an operation situation of an operation panel changes, when the operation panel installed in a stationary machine is vibrated as an operation response.

An operation input device according to an embodiment of the present invention is an operation input that causes a vibrating element to vibrate an operation panel attached to a device main body to notify a user when detecting an operation of the operation panel by the user, the operation input device includes a vibration controller that selects at least one vibration direction from among a plurality of vibration directions and drives the vibrating element in a corresponding direction when detecting an operation input from the operation panel.

An image forming device according to an embodiment of the present invention is an image forming device that causes a vibrating element to vibrate an operation panel attached to a device main body that forms an image on a medium to notify a user when detecting an operation of the operation panel by the user, the image forming device includes a vibration condition storage that stores information on at least a plurality of vibration directions for vibrating the vibrating element, and a vibration controller that selects at least one vibration direction from among the plurality of vibration directions stored in the vibration condition storage and drives the vibrating element when detecting an operation input from the operation panel.

According to an embodiment of the present invention, by changing a vibration direction according to a state and a use condition of an operation panel, it is possible to give a user a good tactile sensation of a vibration response even if the state or the use condition of the operation panel changes.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIGS. 10A and 10B are diagrams illustrating examples of an operation panel according to a second embodiment of the present invention;

FIG. 14 is a flowchart illustrating a control example of a vibration controller according to the second embodiment of the present invention.

DETAILED DESCRIPTION OF EMBODIMENTS

Figure 1:
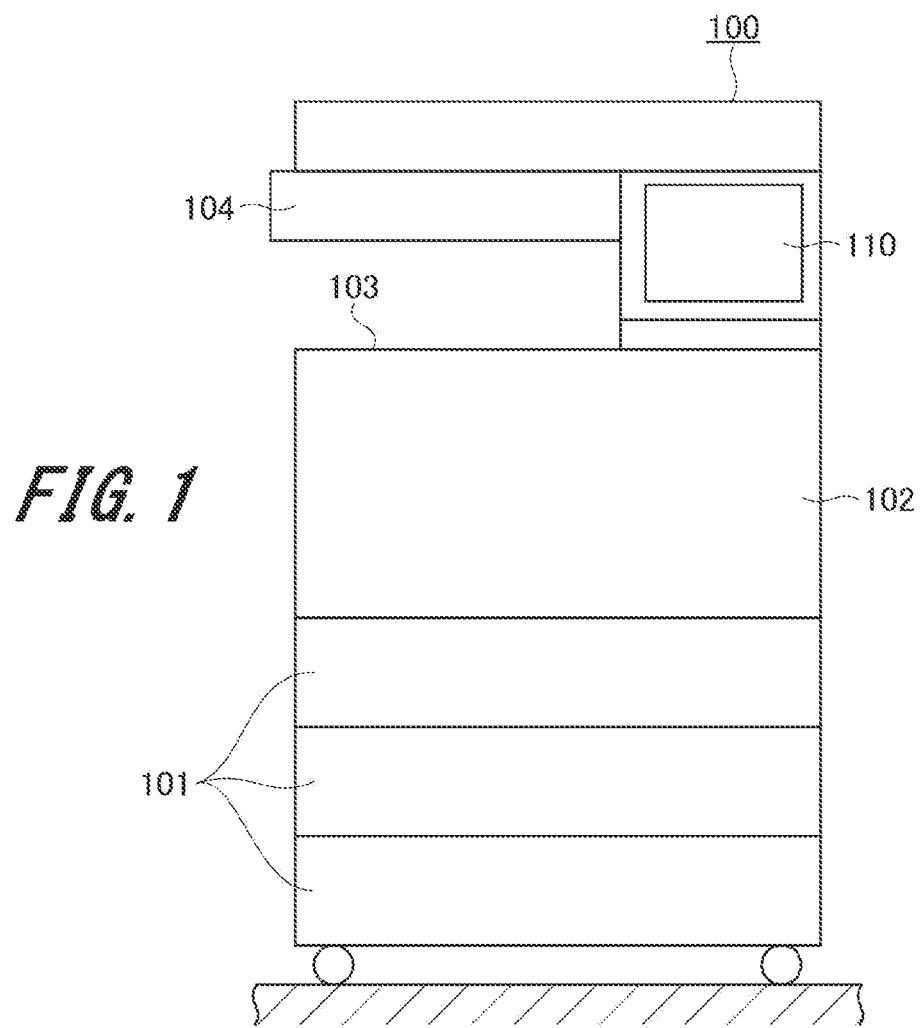
FIG. 1 is a configuration diagram illustrating an example of an image forming device according to a first embodiment of the present invention.

Hereinafter, one or more embodiments of the present invention will be described with reference to the drawings. However, the scope of the invention is not limited to the disclosed embodiments.

Hereinafter, embodiments of the present invention will be described sequentially with reference to the drawings. In the embodiments described below, common parts are denoted by the same reference numerals, and redundant description is omitted.

1. First Embodiment

Hereinafter, a first embodiment of the present invention will be described with reference to FIGS. 1 to 9.

FIG. 1 illustrates an example of an image forming device 100 in the present embodiment.

The image forming device 100 in the present embodiment is a digital multifunctional machine called a digital multifunction peripheral (MFP). The digital multifunction peripheral has a function of a copier, an image scanner, a facsimile, and the like in addition to a function as a printer that forms an image on paper (medium).

The image forming device 100 includes a paper cassette 101, an image former 102, a paper discharger 103, a document reader 104, and an operation panel unit 110.

The image former 102 performs image forming processing of forming an image of a document read by the document reader 104 or an image of a document transmitted from the outside on the front side or the back side of paper conveyed from the paper cassette 101.

The paper on which the image is formed by the image former 102 is discharged from the paper discharger 103.

The operation panel unit 110 is an operation unit for performing various settings related to the image forming processing, an instruction to start image forming, and the like. The operation panel unit 110 includes a liquid crystal display panel that displays various operation buttons and the like, and a touch panel that detects a touch on a panel surface. The liquid crystal display panel included in the digital multifunction peripheral has a relatively large size of, for example, about 10 cm long×20 cm wide.

In addition, the operation panel unit 110 in the present embodiment has a function of vibrate the panel itself as an operation response. Details of the function of vibration will be described later.

Figure 2:
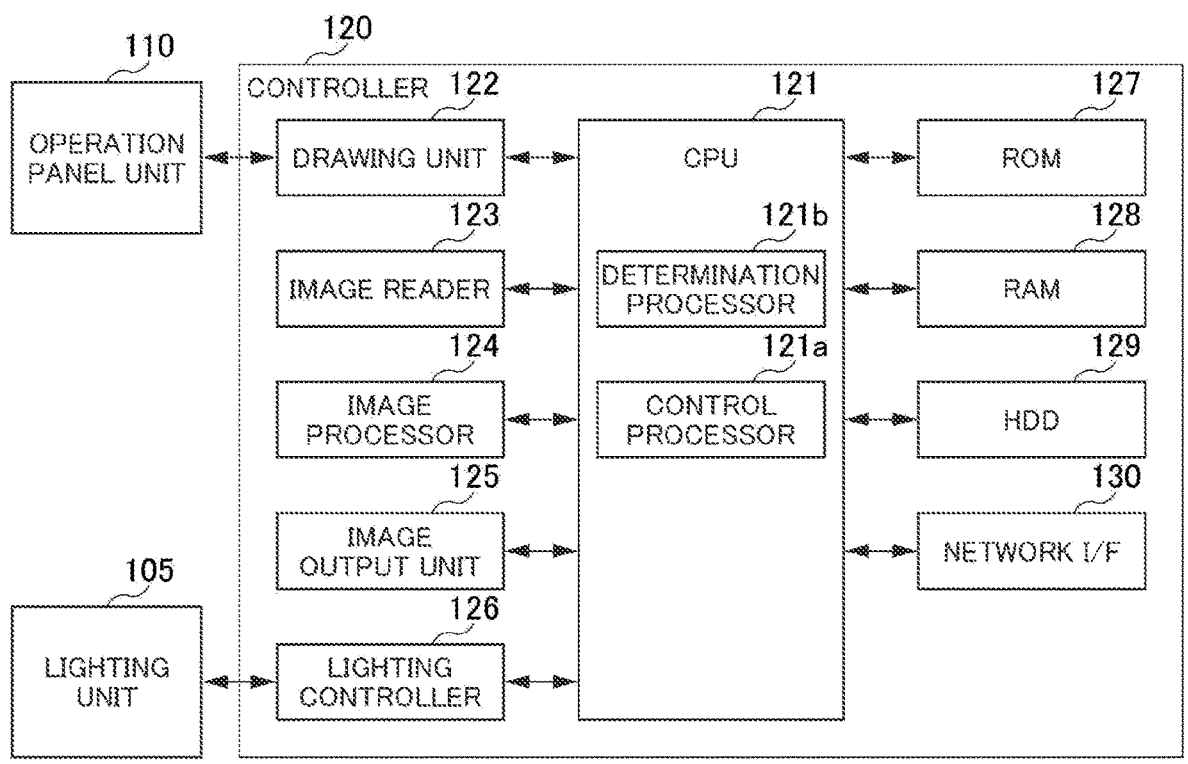
FIG. 2 is a block diagram illustrating an example of a control configuration of the device according to the first embodiment of the present invention.

FIG. 2 illustrates a configuration example of the controller 120 of the image forming device 100. The image forming processing by the image forming device 100 is performed under the control of the controller 120 built in the image forming device 100.

The controller 120 includes a central processing unit (hereinafter, referred to as a "CPU") 121, a drawing unit 122, an image reader 123, an image processor 124, an image output unit 125, and a lighting controller 126. The controller 120 further includes a ROM 127, a RAM 128, a hard disk drive (hereinafter, referred to as an "HDD") 129, and a network interface 130.

The CPU 121 reads a program and data necessary for control from the connected ROM 127, RAM 128, or HDD 129 and performs control processing for image formation. Executing the read program forms, in the CPU 121, a control processor 121a that performs a control processing function. In addition, executing the read program forms, in the CPU 121, a determination processor 121b that performs a determination function of determining the state of each unit of the image forming device 100.

The ROM 127 and the RAM 128 are storages used for temporarily storing data, and the HDD 129 is a storage mainly used for storing image data (document data).

The network interface 130 connected to the CPU 121 receives document data and the like from the outside. In addition, communication with a monitoring department where the operation status of the image forming device 100 is monitored is also performed via the network interface 130.

The document read by the document reader 104 in FIG. 1 is supplied to the CPU 121 via the image reader 123 of the controller 120. The CPU 121 performs image forming processing on a document read via the image reader 123 or a document received by the network interface 130. Here, the CPU 121 is connected to the image processor 124, and the image processor 124 corrects or processes an image obtained from document data. Then, the image data processed by the image processor 124 is output from the image output unit 125, and the image former 102 forms the image (FIG. 1).

The CPU 121 is further connected to the drawing unit 122, and the drawing unit 122 draws an operation screen to be displayed on the operation panel unit 110 based on an instruction from the CPU 121. The operation panel unit 110 displays the operation screen drawn by the drawing unit 122.

The CPU 121 is further connected to the lighting controller 126, and the lighting controller 126 controls lighting of the screen of the operation panel unit 110 based on an instruction from the CPU 121.

Figure 3:
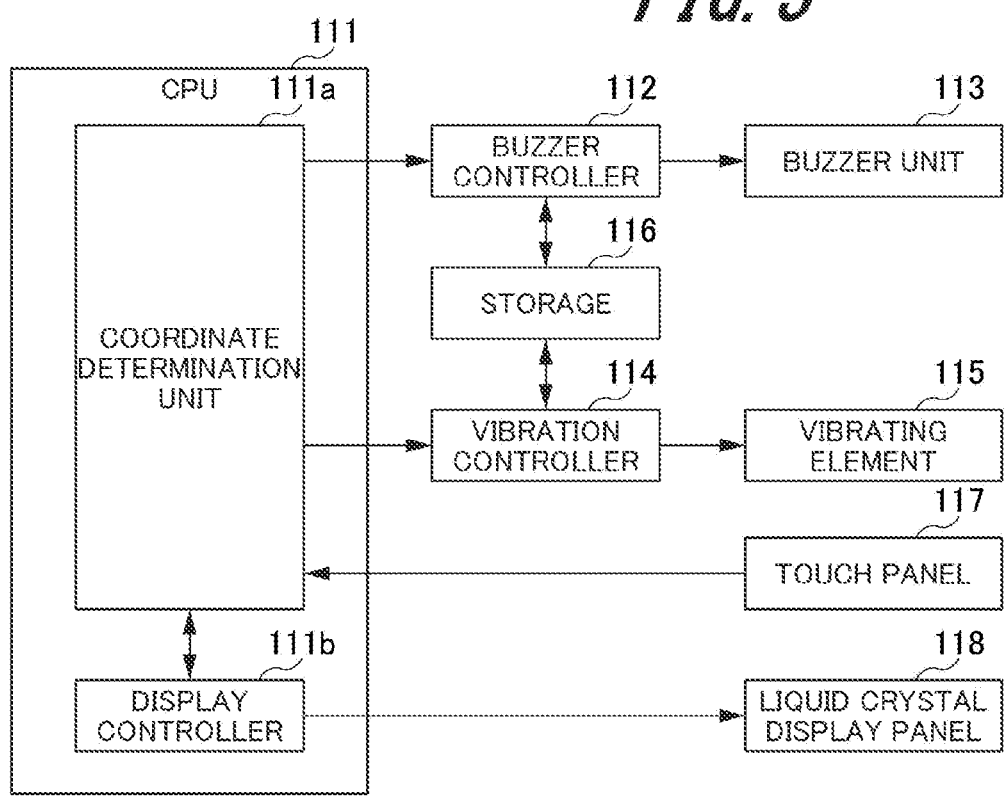
FIG. 3 is a block diagram illustrating a configuration example of an operation unit according to the first embodiment of the present invention.

FIG. 3 illustrates a control configuration of the operation panel unit 110.

The operation panel unit 110 includes a CPU 111, a touch panel 117, and a liquid crystal display panel 118. The touch panel 117 and the liquid crystal display panel 118 are overlapped to be arranged. The touch panel 117 detects a touch on the surface of the display screen of the liquid crystal display panel 118. The CPU 111 controls touch detection by the touch panel 117 and display on the liquid crystal display panel 118.

The CPU 111 includes a coordinate determination unit 111a that determines the coordinates of a position touched on the touch panel 117, and a display controller 111b that controls display on the liquid crystal display panel 118. The display controller 111b controls display on the liquid crystal display panel 118 based on the image data supplied from the drawing unit 122 (FIG. 2) included in the controller 120 of the image forming device 100.

The operation panel unit 110 includes a buzzer unit 113 and a vibrating element 115.

The buzzer unit 113 outputs various sounds, such as a warning sound, under the control of a buzzer controller 112. The type of sound to be output, volume correction, and the like are set based on the data stored in the storage 116. The buzzer controller 112 controls output of a warning sound or the like based on an instruction from the CPU 111.

The vibrating element 115 vibrates the touch panel 117 and the liquid crystal display panel 118 under the control of a vibration controller 114. Data on vibration states, such as a vibration direction and a vibration intensity, when the vibrating element 115 vibrates the touch panel 117 and the liquid crystal display panel 118 is stored in the storage 116. The vibration controller 114 controls the vibration states by the vibrating element 115 while reading data stored in the storage 116 based on an instruction from the CPU 111.

In the configuration illustrated in FIG. 3, the CPU 111 and the vibration controller 114 are separated, but the CPU 111 may have a function as the vibration controller 114 in order for the CPU 111 to directly control the vibrating element 115.

Next, a configuration in which the vibrating element 115 vibrates the touch panel 117 and the liquid crystal display panel 118 is described with reference to FIG. 4.

Figure 4:
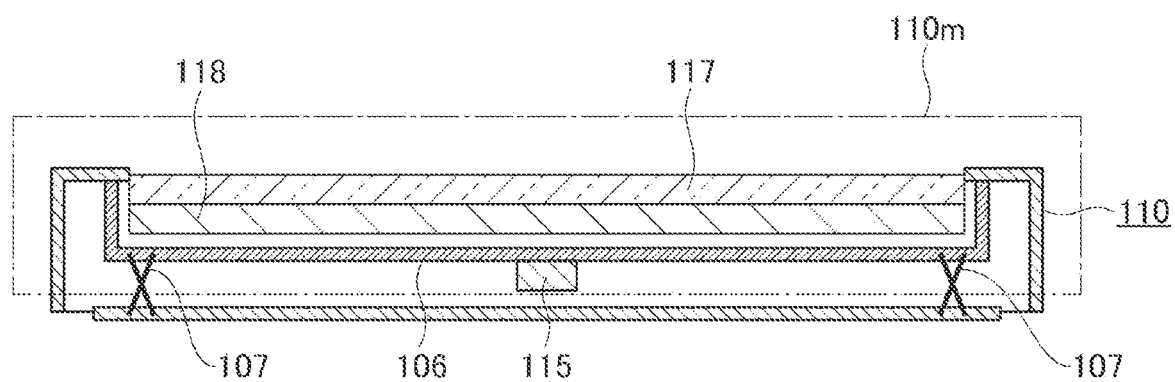
FIG. 4 is a cross-sectional view illustrating an example of an operation panel unit according to the first embodiment of the present invention.

FIG. 4 is a cross-sectional view of the operation panel unit 110 attached to the image forming device 100.

The touch panel 117 and the liquid crystal display panel 118 of the operation panel unit 110 are arranged on an operation panel holding frame 106. The operation panel holding frame 106 is installed on the housing side of the image forming device 100 interposing a vibration absorbing member 107.

The vibration absorbing member 107 is made of rubber, a spring, a damper, or the like, and is arranged at each of the four corners of the operation panel holding frame 106. The arrangement of the vibration absorbing member 107 at each of the four corners is an example, and the vibration absorbing member 107 may be formed of, for example, a rubber sheet and arranged on the entire back surface side of the operation panel holding frame 106.

The vibrating element 115 is attached to the back surface side of the operation panel holding frame 106. The vibrating element 115 vibrates the operation panel holding frame 106, the touch panel 117, and the liquid crystal display panel 118 in a specific direction by applying a drive signal. The vibrating element 115 is constituted by, for example, a linear actuator and generates vibration in a specific direction by linear motion.

However, as described later, the vibrating element 115 in the present embodiment can vibrate in a plurality of directions and is set to vibrate in at least one vibration direction under the control of the vibration controller 114.

Here, the operation panel holding frame 106 is installed on the device main body interposing the vibration absorbing member 107. Thus, vibration is not transmitted to the main body of the image forming device 100 except for the operation panel unit 110, and the operation panel unit 110 efficiently vibrates while being separated from the main body.

Figure 5:
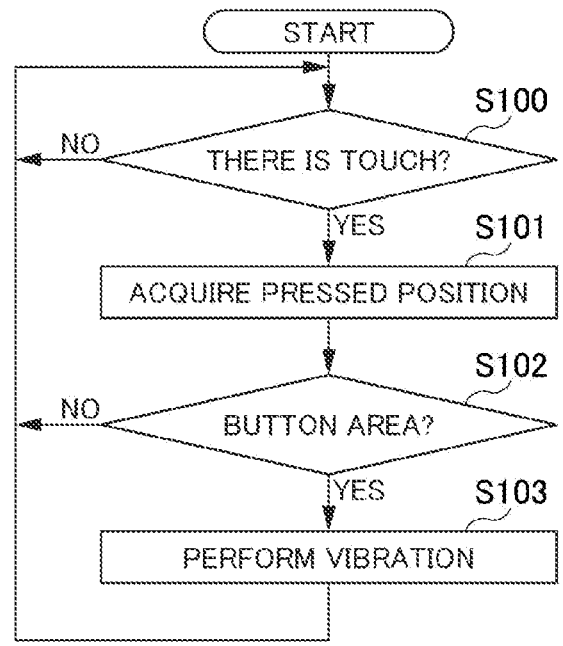
FIG. 5 is a flowchart illustrating a basic control example of a vibration controller according to the first embodiment of the present invention.

FIG. 5 is a flowchart illustrating basic processing when the CPU 111 of the operation panel unit 110 vibrates the vibrating element 115. The flowchart of FIG. 5 does not include the description for the processing of selecting a vibration direction by the control of the CPU 111 and the vibration controller 114 of the operation panel unit 110 when the vibrating element 115 is driven. The processing of selecting a vibration direction when the vibrating element 115 is driven will be described later with reference to the flowchart of FIG. 9.

First, the CPU 111 performs touch detection as to whether the touch panel 117 has been pressed (step S100). Here, the CPU 111 detects, for example, an interrupt signal from the touch panel 117 to determine that the touch panel 117 has been pressed.

Here, if there is no touch (NO in step S100), the CPU 111 performs no processing for vibration and repeats this determination processing until a touch is detected in step S100.

When a touch is detected in step S100 (YES in step S100), the CPU 111 acquires the position pressed on the touch panel 117 (step S101). Then, the CPU 111 determines whether the pressed position (touched position) acquired in step S101 is in any button area displayed on the liquid crystal display panel 118 (step S102).

Here, when the pressing is not in any button area (NO in step S102), the CPU 111 returns to the determination in step S100 and repeatedly performs the same processing if pressing is newly detected.

Alternatively, when the pressing is in any button area in step S102 (YES in step S102), the CPU 111 instructs the vibration controller 114 to perform the vibration processing (step S103), returns to the determination in step S100, and repeatedly performs the same processing if pressing is newly detected.

The vibration controller 114 that has received the instruction of the vibration processing in step S103 vibrates the vibrating element 115 for a short time. For example, the vibration controller 114 vibrates the vibrating element 115 for a short time of about 20 ms to 100 ms.

By performing the short-time vibration by vibrating element 115, when the touch panel 117 right above the button displayed on the liquid crystal display panel 118 is pressed, a response to the pressing is performed by vibration.

The touch panel 117 may be pressed by either a finger of the user performing the operation or a touch pen prepared in advance.

As described above, the image forming device 100 according to the present embodiment has a configuration in which the operation panel unit 110 includes the touch panel 117, and when the touch panel 117 is touched by a user's finger or the like, a response is performed by vibration of the touch panel 117 itself. If the touched position is in an area other than the buttons displayed on the liquid crystal display panel 118, no vibration response is performed, and only when the user properly touches a button position, the user who has performed operation is precisely notified of the touch by vibration.

As described above, the image forming device 100 according to the present embodiment performs a response by vibration of the touch panel 117 itself when the touch panel 117 is touched by a user's finger or the like. Here, the difference in sensation transmitted to the finger depending on the vibration direction when the vibrating element 115 vibrates the touch panel 117 is described.

Figure 6A:
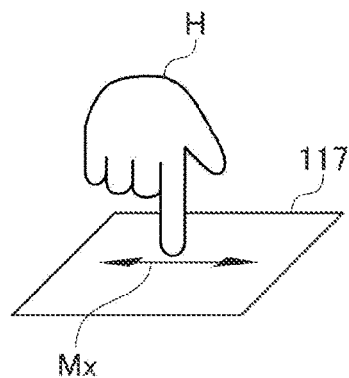
FIGS. 6A to 6C are diagrams for explaining the difference in sensation depending on the difference in vibration directions.
Figure 6B:
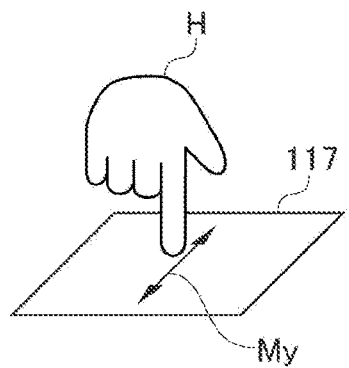
Figure 6C:
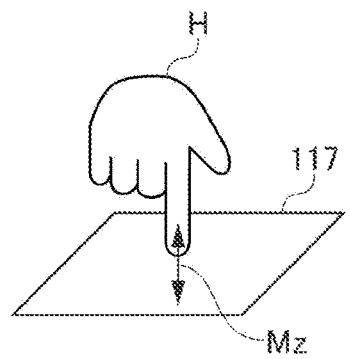

FIGS. 6A to 6C illustrate a case where the touch panel 117 is vibrated in an X direction (lateral direction) (FIG. 6A), a case where the touch panel 117 is vibrated in a Y direction (longitudinal direction) (FIG. 6B), and a case where the touch panel 117 is vibrated in a Z direction (vertical direction) (FIG. 6C).

As illustrated in FIG. 6A, when the touch panel 117 is vibrated in the X direction, vibration Mx transmitted to the fingertip of a touching hand H is vibration in the lateral direction. As illustrated in FIG. 6B, when the touch panel 117 is vibrated in the Y direction, vibration My transmitted to the fingertip of the touching hand H is vibration in the longitudinal direction. As illustrated in FIG. 6C, when the touch panel 117 is vibrated in the Z direction, vibration Mz transmitted to the fingertip of the touching hand H is vibration in the vertical direction.

As illustrated in FIGS. 6A, 6B, and 6C, the difference in the vibration direction of the operation surface also causes the difference in the sensation of vibration that the operator's fingertip feels. In the following description, when the vibration direction is referred to as the X direction, the Y direction, or the Z direction, it means the vibration direction as illustrated in FIGS. 6A to 6C.

Figure 7A:
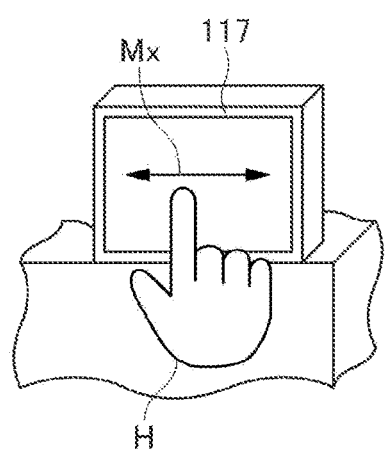
FIGS. 7A and 7B are diagrams for explaining a change in a vibration direction depending on an orientation of an operation panel.
Figure 7B:
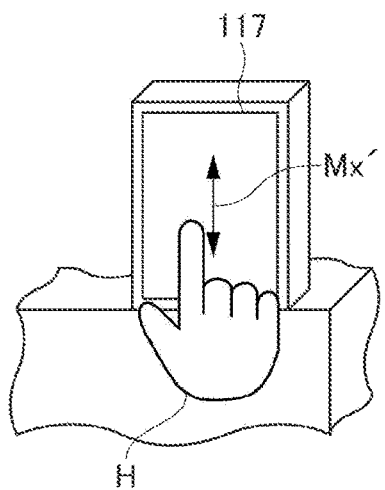

Next, with reference to FIGS. 7A and 7B, a point that the vibration direction changes depending on the arrangement state of the touch panel 117 when the touch panel 117 is operated is described.

FIG. 7A illustrates a case where the touch panel 117 is arranged to be a horizontal orientation, and FIG. 7B illustrates a case where the touch panel 117 is arranged to be a vertical orientation. The vibration by the vibrating element 115 here is the vibration Mx in the X direction (lateral direction).

As can be seen by comparing FIGS. 7A and 7B, when the arrangement orientation of the touch panel 117 is changed, the vibration direction when the vibration Mx by the vibrating element 115 is transmitted to the fingertip of the operator's hand H also changes in conjunction with the change in the arrangement orientation.

Here, for example, as illustrated in FIG. 7B, when the direction of the vibration Mx by the vibrating element 115 coincides with the weight direction (vertical direction), the amount of vibration is damped due to the influence of gravity. Thus, in the state illustrated in FIG. 7B, it is more difficult to feel a vibration response with the fingertip than in the case of FIG. 7A.

For this reason, in the present embodiment, the vibrating element 115 that vibrates the touch panel 117 is configured to vibrate in a plurality of directions. With this configuration, by controlling the vibration direction of the vibrating element 115 according to the setting condition, such as the orientation of the touch panel 117, it is possible to perform an appropriate vibration response in any situation.

Next, a configuration in which the vibrating element 115 can vibrate in a plurality of directions is described with reference to FIG. 8. In the present embodiment, the vibrating element 115 is arranged on the operation panel holding frame 106 as already described with reference to FIG. 4, but for the sake of simplicity of description, it is assumed that the vibrating element 115 is attached to the back surface side of the touch panel 117.

Figure 8A:
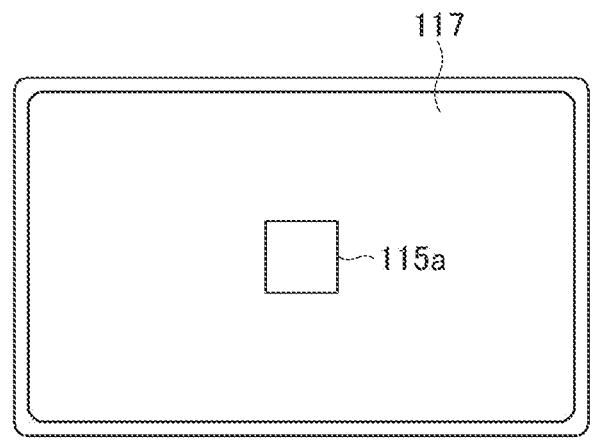
FIGS. 8A to 8C are diagrams illustrating arrangement examples of a vibrating element according to the first embodiment of the present invention.

In the example illustrated in FIG. 8A, a vibrating element 115a capable of vibrating in a plurality of vibration directions is disposed on the back surface side of the touch panel 117. The vibrating element 115a can selectively perform, for example, three types of vibration including vibration in the Mx direction, vibration in the My direction, and vibration in the Mz direction illustrated in FIGS. 6A to 6C.

Figure 8B:
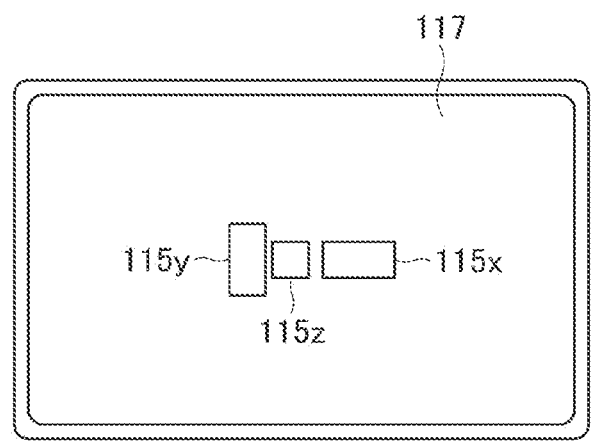

In the example illustrated in FIG. 8B, a plurality of vibrating elements 115x, 115y, and 115z each having a different vibration direction is disposed on the back surface side of the touch panel 117. The three vibrating elements 115x, 115y, and 115z individually vibrate in, for example, the Mx direction, the My direction, and the Mz direction illustrated in FIGS. 6A to 6C, respectively.

Figure 8C:
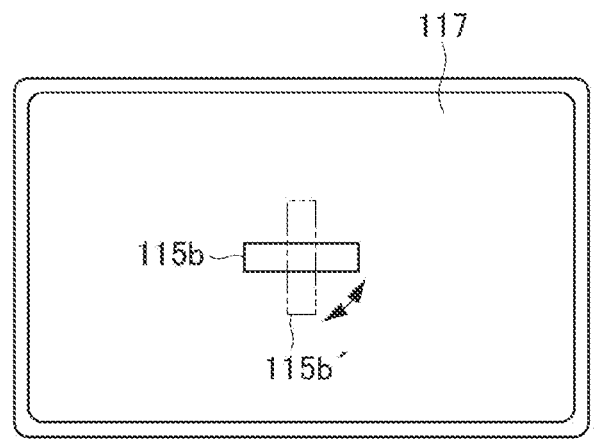

In the example illustrated in FIG. 8C, a vibrating element 115b whose attachment position is movable is arranged on the back surface side of the touch panel 117. For example, the arrangement position of the vibrating element 115b can be selected from an arrangement position where the vibrating element 115b can vibrate in the lateral direction (Mx direction) as indicated by a solid line in FIG. 8C and an arrangement position where the vibrating element 115b can vibrate in the longitudinal direction (My direction) as indicated by a broken line in FIG. 8C.

In the case of FIG. 8C, the vibrating element 115b is attached on the back surface side of the touch panel 117 by a vibrating element movable holder unit (not illustrated) in such a manner as to be movable.

Note that the arrangement of the vibrating element 115b may be selected in such a manner that the vibrating element 115b can vibrate in the vertical direction (Mz direction) with the vibrating element movable holder.

In the present embodiment, one of the configurations in the examples of FIGS. 8A, 8B, and 8C is used as the vibrating element 115 in order for the vibrating element 115 to vibrate in a plurality of directions. Then, when a vibration response using the vibrating element 115 is performed, the vibration response is performed in any vibration direction according to the setting of the device at that time. The setting, such as a vibration direction, is stored in, for example, the storage 116 (FIG. 3).

Figure 9:
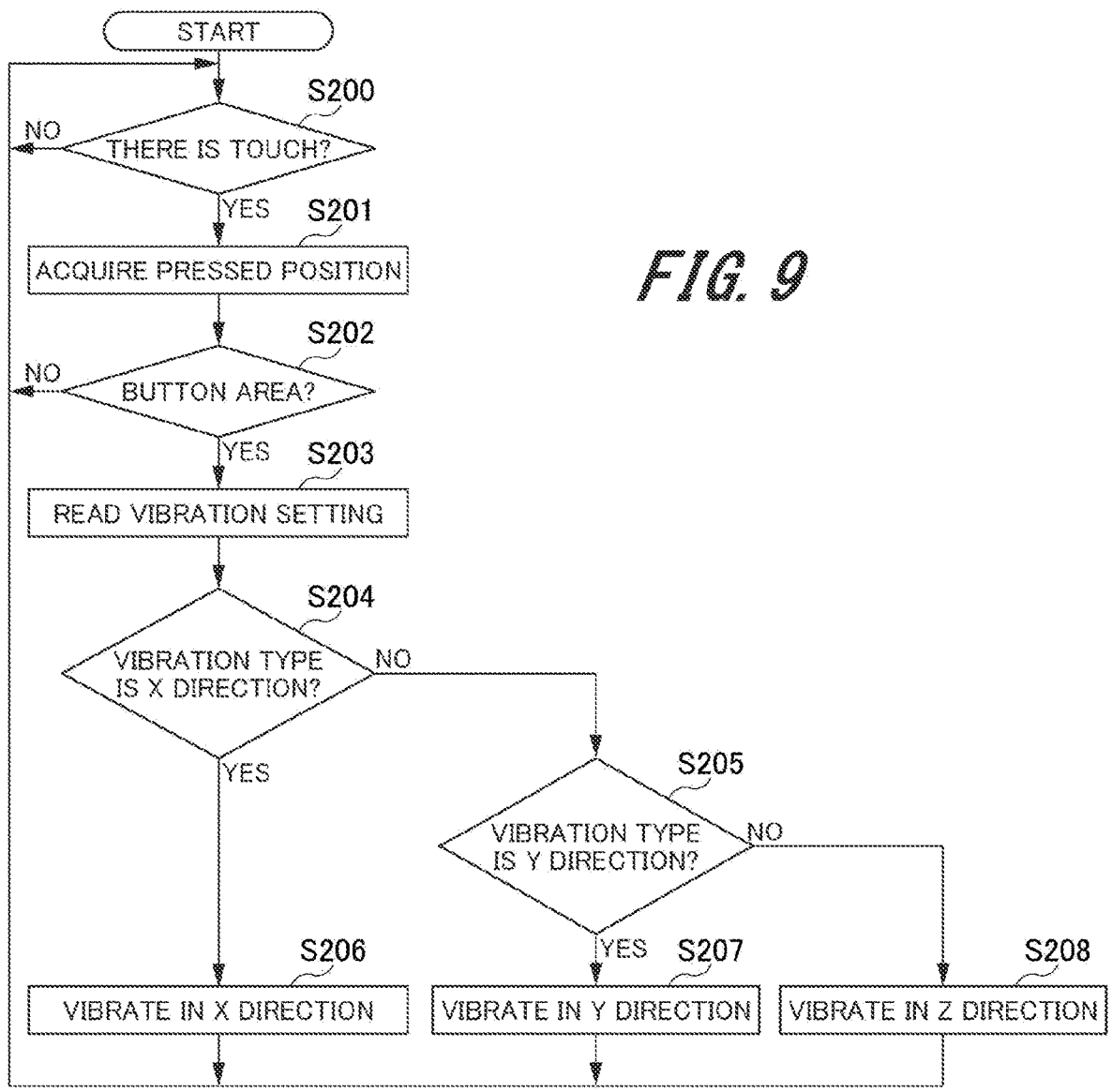
FIG. 9 is a flowchart illustrating a detailed control example of the vibration controller according to the first embodiment of the present invention.

FIG. 9 is a flowchart showing a procedure of processing of selecting a vibration direction by the control of the CPU 111 of the operation panel unit 110 when the vibrating element 115 is driven.

First, the CPU 111 performs touch detection as to whether the touch panel 117 has been pressed (step S200). Here, the CPU 111 detects, for example, an interrupt signal from the touch panel 117 to determine that the touch panel 117 has been pressed.

Here, if there is no touch (NO in step S200), the CPU 111 performs no processing for vibration and repeats this determination processing until a touch is detected in step S200.

When a touch is detected in step S200 (YES in step S200), the CPU 111 acquires the position pressed on the touch panel 117 (step S201). Then, the CPU 111 determines whether the pressed position (touched position) acquired in step S201 is in any button area displayed on the liquid crystal display panel 118 (step S202).

Here, when the pressing is not in any button area (NO in step S202), the CPU 111 returns to the determination in step S200 and repeatedly performs the same processing if pressing is newly detected.

Alternatively, when the pressing is in any button area in step S202 (YES in step S202), the vibration controller 114 reads setting information on the current vibration direction based on an instruction from the CPU 111 (step S203).

Then, the vibration controller 114 determines whether the read setting of the vibration direction is the X direction (step S204).

When determining in step S204 that the setting of the vibration direction is the X direction (YES in step S204), the vibration controller 114 drives the vibrating element 115 in the X direction to perform a vibration response to the touch (step S206).

When determining in step S204 that the setting of the vibration direction is not the X direction (NO in step S204), the vibration controller 114 determines whether the read setting of the vibration direction is the Y direction (step S205).

When determining in step S205 that the setting of the vibration direction is the Y direction (YES in step S205), the vibration controller 114 drives the vibrating element 115 in the Y direction to perform a vibration response to the touch (step S207).

On the other hand, when determining in step S205 that the setting of the vibration direction is not the Y direction (NO in step S205), the vibration controller 114 drives the vibrating element 115 in the Z direction to perform a vibration response to the touch (step S208).

As described above, it is possible for the image forming device 100 according to the present embodiment to select a vibration direction for performing a vibration response based on a predetermined setting condition.

As a condition for determining the vibration direction, the vibration direction may be set according to the type of a user who performs operation.

That is, the image forming device 100 includes a user authenticator that identifies a user with an authentication card or an input of an authentication code and a storage (the HDD 129 or the like) that stores setting of a vibration condition (setting of the vibration direction) for each user. Then, when the user authenticator identifies a user using the image forming device 100, the vibration controller 114 reads the vibration condition for the corresponding user stored in the storage, and sets the vibration direction and the vibration intensity based on the vibration condition.

By setting the vibration condition for each user in this manner, each user can set a preferred vibration condition, and a vibration response can be appropriately performed under the set vibration condition.

In addition, the image forming device 100 may store an operation image to be displayed by the display controller 111b in association with the vibration condition in a storage (the HDD 129 or the like), read the vibration condition corresponding to the operation image to be displayed by the display controller 111b, and cause the vibration controller 114 to drive the vibrating element 115.

For example, when a position where a function selection button or the like is displayed is touched, the vibrating element 115 vibrates weakly in a direction parallel to the operation surface of the touch panel 117. When a position of a button for instruction of execution, such as a print start button or a delete button, is touched, the vibrating element 115 vibrate strongly in a direction orthogonal to the operation surface of the touch panel 117.

In this manner, by changing the vibration condition according to the display content, it is possible for a user to know, from the vibration response state, what kind of response has been made and thereby performing an appropriate vibration response.

2. Second Embodiment

Next, a second embodiment of the present invention will be described with reference to FIGS. 10 to 14. In FIGS. 10 to 14, parts corresponding to those in FIGS. 1 to 9 described in the first embodiment are denoted by the same reference numerals, and redundant description is omitted.

In the present embodiment, an operation panel unit 110 included in an image forming device 100 is movable with respect to the device main body, and a vibration state of a vibrating element 115 is changeable according to the movable state of the operation panel unit 110. Note that the image forming device 100 in the present embodiment is configured similarly to the image forming device 100 described in the first embodiment except for the configuration of the operation panel unit 110 that is movable.

First, with reference to FIGS. 10A and 10B, it is described that the intensity of vibration transmitted to an operator's fingertip changes depending on the vibration direction of the vibrating element 115 arranged on the operation panel unit 110.

FIG. 10A illustrates that the vibrating element 115 vibrates a touch panel 117 arranged on the operation panel unit 110 in a direction M1 parallel to the surface of the touch panel 117. FIG. 10B illustrates that the vibrating element 115 vibrates the touch panel 117 arranged on the operation panel unit 110 in a direction M2 orthogonal to the surface of the touch panel 117. In both cases of FIGS. 10A and 10B, the operation surface of the touch panel 117 is horizontally arranged.

In the case of the vibration direction M1 illustrated in FIG. 10A, the gravity direction of the touch panel 117 (up/down direction in the drawing) is different from the vibration direction M1, and damping of vibration due to the gravity (own weight) does not occur when the vibrating element 115 vibrates.

On the other hand, in the case of the vibration direction M2 illustrated in FIG. 10B, the gravity direction of the touch panel 117 coincides with the vibration direction M2, and damping of vibration due to the gravity (own weight) occurs when the vibrating element 115 vibrates. Thus, when the gravity direction of the touch panel 117 coincides with the vibration direction, it is preferable to increase the driving force for the vibrating element 115 to compensate for the damping due to the gravity.

Here, the operation panel unit 110 is movable in the present embodiment, and whether the gravity direction coincides with the vibration direction of the operation panel unit 110 is different depending on the orientation of the operation panel unit 110.

Figure 11A:
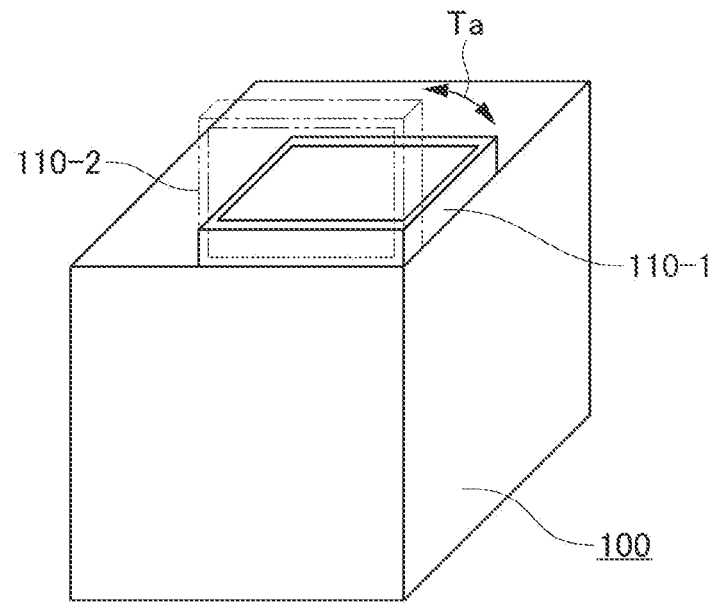
FIGS. 11A and 11B are diagrams illustrating a tilting operation (FIG. 11A) and a rotating operation (FIG. 11B) of the operation panel according to the second embodiment of the present invention.
Figure 11B:
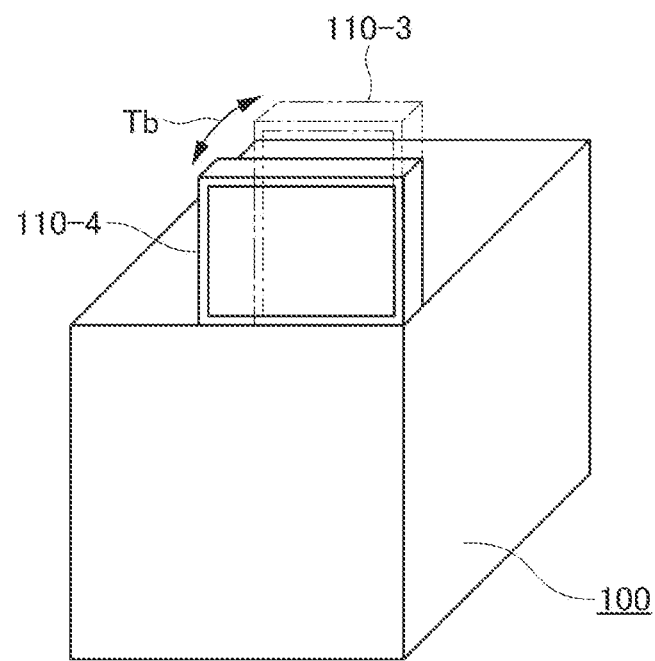

FIGS. 11A and 11B illustrate a configuration in which the orientation of the operation panel unit 110 is changed in the image forming device 100 in the present embodiment.

FIG. 11A illustrates an example when the operation panel unit 110 of the image forming device 100 is caused to perform a tilting operation. As illustrated in FIG. 11A, the image forming device 100 in the present embodiment can freely set a tilt angle Ta between an operation panel unit 110-1 arranged in the horizontal state and an operation panel unit 110-2 arranged in the upright state.

As illustrated in FIG. 11B, the image forming device 100 in the present embodiment can freely set a rotation angle Tb between an operation panel unit 110-3 arranged to be a vertical orientation and an operation panel unit 110-4 arranged to be a horizontal orientation.

These are achieved by coupling the operation panel unit 110 to the main body of the image forming device 100 by an operation panel holder (not illustrated) while the tilting operation and the rotation operation can be performed. In addition, the tilt angle Ta and the rotation angle Tb are detected by an operation panel state detector (not illustrated) built in the image forming device 100.

Figure 12A:
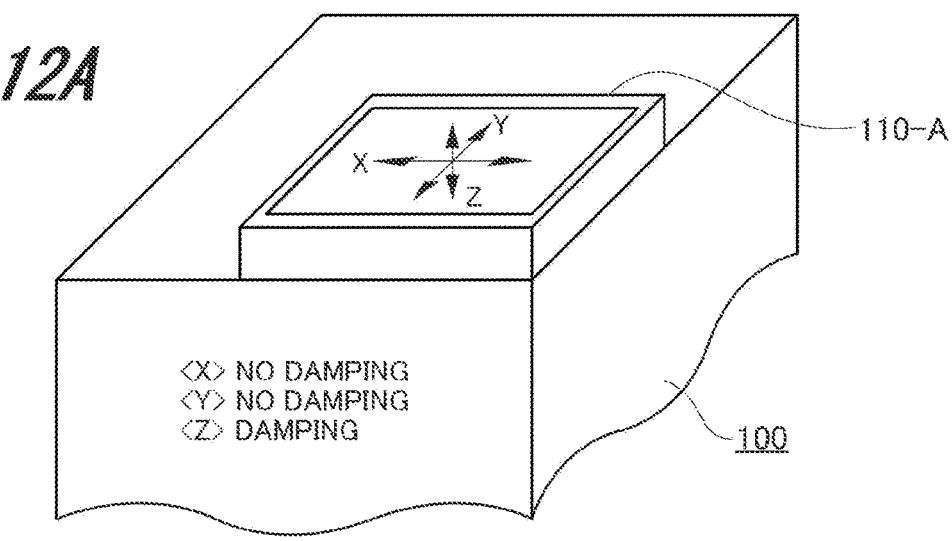
FIGS. 12A to 12C are diagrams illustrating a change in a vibration direction during the tilting operation and the rotating operation of the operation panel according to the second embodiment of the present invention.
Figure 12B:
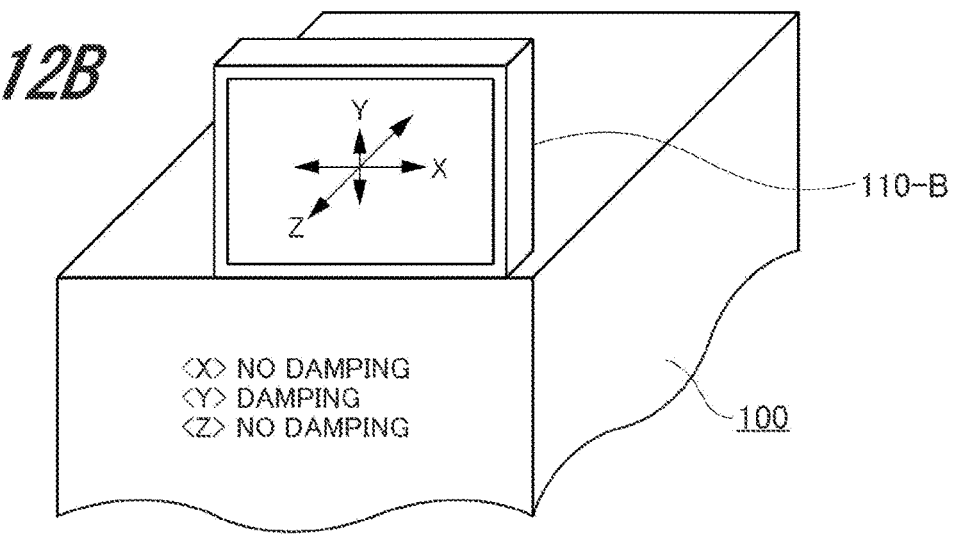
Figure 12C:
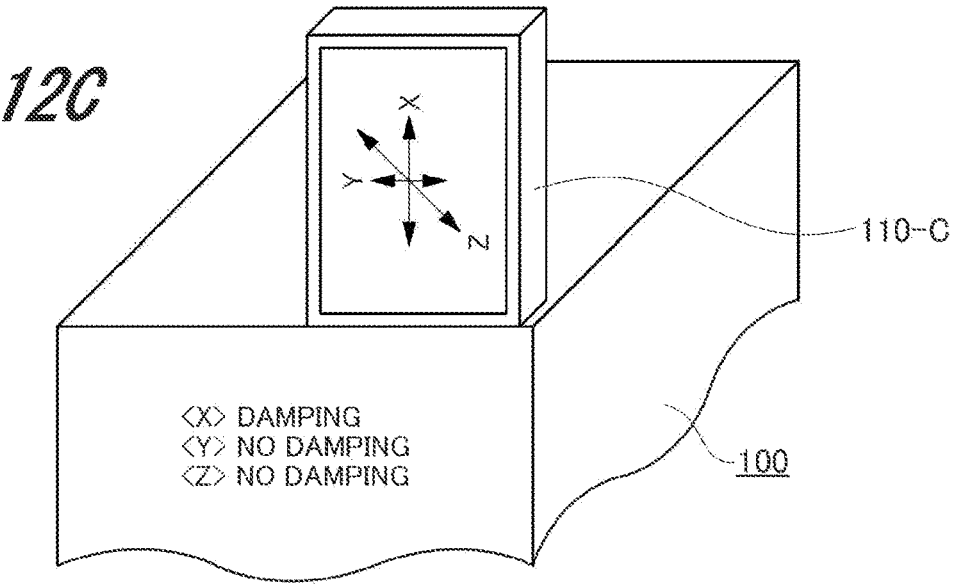

FIGS. 12A to 12C illustrate that the vibration direction by the vibrating element 115 attached to the operation panel unit 110 changes when the tilt angle Ta and the rotation angle Tb of the operation panel unit 110 are changed.

As described with reference to FIGS. 6A to 6C in the first embodiment, the vibrating element 115 can select three vibration directions; a case where the touch panel 117 is vibrated in the X direction (lateral direction) (FIG. 6A), a case where the touch panel is vibrated in the Y direction (longitudinal direction) (FIG. 6B), and a case where the touch panel is vibrated in the Z direction (vertical direction) (FIG. 6C).

As illustrated in FIG. 12A, in the case of an operation panel unit 110-A arranged in the horizontal state, the X direction is the front-back direction of the surface of the operation panel unit 110, and the Y direction is the left-right direction of the operation panel unit 110. The Z direction orthogonal to the X direction and the Y direction is the vertical direction of the operation panel unit 110, and the Z direction is the gravity direction.

On the other hand, as illustrated in FIG. 12B, in the case of the operation panel unit 110-B arranged in the upright state and to be the horizontal orientation, the gravity direction is the Y direction. In addition, as illustrated in FIG. 12C, in the case of the operation panel unit 110-C arranged in the upright state and to be the vertical orientation, the gravity direction is the X direction.

In this manner, the vibration direction coinciding with the gravity direction changes as the tilt angle Ta or the rotation angle Tb of the operation panel unit 110 is changed. Here, as already described, in the direction coinciding with the gravity direction, damping of vibration due to the gravity (own weight) occurs when the operation panel unit 110 is vibrated by the vibrating element 115. However, since the direction coinciding with the gravity direction changes depending on the tilt angle Ta and the rotation angle Tb, the direction in which the damping of vibration due to the gravity is to be corrected needs to be changed depending on the arrangement angle of the operation panel unit 110.

FIGS. 13A to 13D illustrate examples of the gravity direction and the vibration directions not affected by gravity in the operation panel units 110-A, 110-B, and 110-C at the three arrangement positions illustrated in FIGS. 12A to 12C and in an operation panel unit 110-D when the tilt angle Ta is set between 0° and 90°.

Figure 13A:
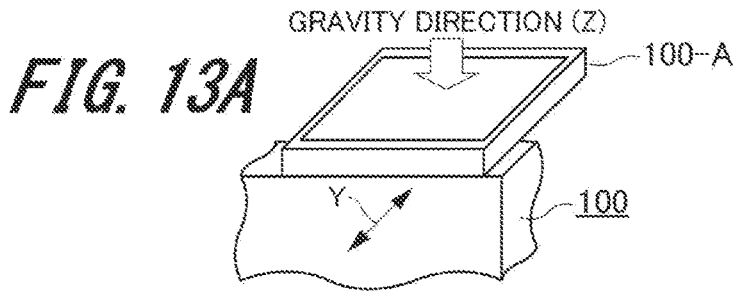
FIGS. 13A to 13D are diagrams illustrating setting examples of a vibration direction during the tilting operation and the rotating operation of the operation panel according to the second embodiment of the present invention.

In the case of the operation panel unit 110-A having the tilt angle Ta of 0° illustrated in FIG. 13A, the Z direction, which is the vertical direction of the operation panel unit 110, is the gravity direction. Thus, in the case of the operation panel unit 110-A, it is possible to perform vibration without being affected by gravity by setting the X direction or the Y direction as the vibration direction.

Figure 13B:
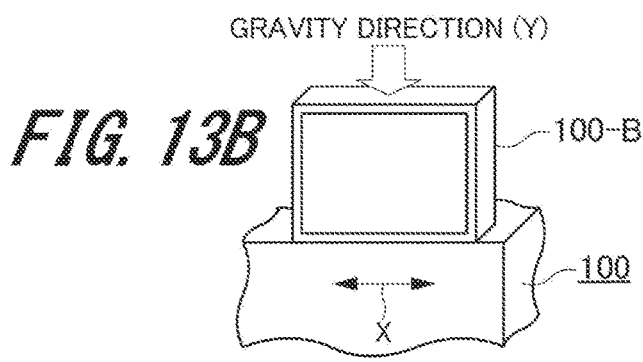

In the case of the operation panel unit 110-B having the tilt angle Ta of 90° and arranged to be a horizontal orientation by rotation as illustrated in FIG. 13B, the Y direction, which is the direction connecting the upper end and the lower end of the operation panel unit 110, is the gravity direction. Thus, in the case of the operation panel unit 110-B, it is possible to perform vibration without being affected by gravity by setting the X direction or the Z direction as the vibration direction.

Figure 13C:
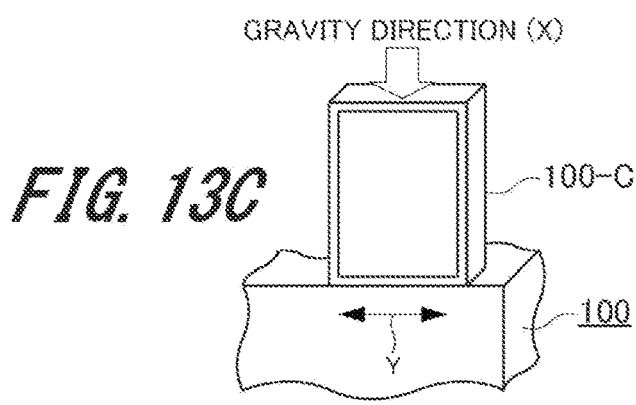

In the case of the operation panel unit 110-C having the tilt angle Ta of 90° and arranged to be a vertical orientation by rotation as illustrated in FIG. 13C, the X direction, which is the direction connecting the upper end and the lower end of the operation panel unit 110, is the gravity direction. Thus, in the case of the operation panel unit 110-C, it is possible to perform vibration without being affected by gravity by setting the Y direction or the Z direction as the vibration direction.

Figure 13D:
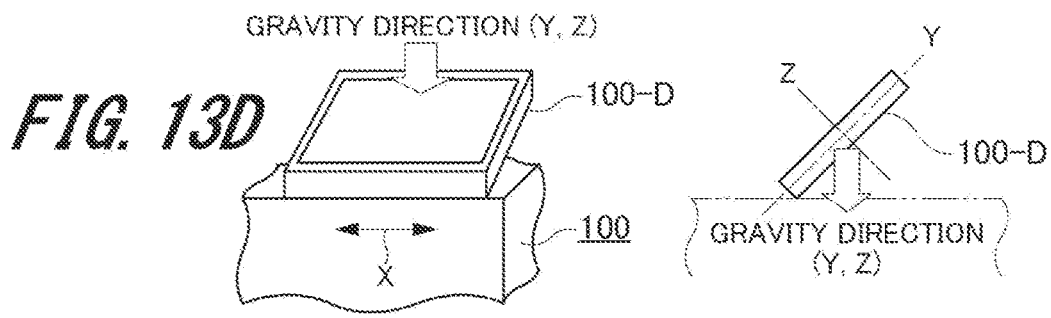

In addition, in the case of the operation panel unit 110-D having the tilt angle Ta between 0° and 90° to be tilted and arranged to be a horizontal orientation by rotation as illustrated in FIG. 13D, the gravity is applied in both the Y direction and the Z direction.

As can be seen from the above description, in order to eliminate the influence of gravity when a vibration response is performed at a touch of the touch panel 117 arranged on the operation panel unit 110, it is necessary to detect the arrangement state of the operation panel unit 110 and set an appropriate vibration direction according to the detected arrangement state.

FIG. 14 is a flowchart showing a procedure of processing when the vibrating element 115 is driven by the control of the CPU 111 of the operation panel unit 110 in the present embodiment.

First, the CPU 111 performs touch detection as to whether the touch panel 117 has been pressed (step S300). Here, the CPU 111 detects, for example, an interrupt signal from the touch panel 117 to determine that the touch panel 117 has been pressed.

Here, if there is no touch (NO in step S300), the CPU 111 performs no processing for vibration and repeats this determination processing until a touch is detected in step S300.

When a touch is detected in step S300 (YES in step S300), the CPU 111 acquires the position pressed on the touch panel 117 (step S301). Then, the CPU 111 determines whether the pressed position (touched position) acquired in step S301 is in any button area displayed on the liquid crystal display panel 118 (step S302).

Here, when the pressing is not in any the button area (NO in step S302), the CPU 111 returns to the determination in step S300 and repeatedly performs the same processing if pressing is newly detected.

Alternatively, when the pressing is in any button area in step S302 (YES in step S302), the vibration controller 114 acquires the tilt angle and rotation angle, which are the current state of the operation panel unit 110, based on an instruction from the CPU 111 (step S303). The state of the operation panel unit 110 is detected by an operation panel state detector (not illustrated).

Then, the vibration controller 114 determines whether the acquired tilt angle is 0° (step S304).

When determining in step S304 that the tilt angle is 0° (YES in step S304; the state illustrated in FIG. 13A), the vibration controller 114 drives the vibrating element 115 in the X direction or the Y direction to perform a vibration response to the touch (step S305).

When determining in step S304 that the tilt angle is not 0° (NO in step S304), the vibration controller 114 determines whether the tilt angle is 90° (step S306).

When determining in step S306 that the tilt angle is 90° (YES in step S306), the vibration controller 114 determines whether the rotation position is horizontal or vertical (step S307).

When determining in step S307 that the rotation position is horizontal (YES in step S307; the state illustrated in FIG. 13B), the vibration controller 114 drives the vibrating element 115 in the X direction or the Z direction to perform a vibration response to the touch (step S308).

When determining in step S307 that the rotation position is vertical (NO in step S307; the state illustrated in FIG. 13C), the vibration controller 114 drives the vibrating element 115 in the Y direction or the Z direction to perform a vibration response to the touch (step S309).

When determining in step S306 that the tilt angle is not 90° ("other than 90°" in step S306), the vibration controller 114 determines whether the rotation position is horizontal or vertical (step S310).

When determining in step S310 that the rotation position is horizontal (YES in step S310; the state illustrated in FIG. 13D), the vibration controller 114 drives the vibrating element 115 in the X direction to perform a vibration response to the touch (step S311).

When determining in step S310 that the rotation position is vertical (NO in step S310), the vibration controller 114 drives the vibrating element 115 in the Y direction to perform a vibration response to the touch (step S312).

As described above, according to the image forming device 100 in the present embodiment, the direction in which the vibrating element 115 perform a vibration response is to be set to a direction other than the gravity direction when the tilt angle and the rotation angle of the operation panel unit 110 on which the touch panel 117 is disposed are set to desired angles. Accordingly, it is possible for the image forming device 100 in the present embodiment to appropriately perform a vibration response by the vibrating element 115 with an appropriate intensity without damping due to the influence of gravity regardless of the angle at which the operation panel unit 110 is installed.

3. Modifications

In the second embodiment described above, the vibration direction is set to avoid the gravity direction according to the angle of the operation panel unit 110.

In contrast, vibration in the gravity direction may be individually or simultaneously performed according to the installation angle of the operation panel unit 110. In this case, if vibration in the gravity direction is performed simultaneously with the other directions, the driving force for the vibrating element 115 may be made stronger than in the other directions to compensate for the damping due to the influence of gravity. Even when vibration is performed only in the gravity direction, it is preferable to make the vibration stronger than the case where vibration is performed only in the other directions to compensate for the damping due to the influence of gravity.

In addition, in the second embodiment described above, any one vibration direction is selected. In contrast, three vibration directions of the X direction, the Y direction, and the Z direction may be combined according to the arrangement angle of the operation panel unit 110.

For example, when the tilt angle is set to about 45° as illustrated in FIG. 13D, vibration in the Y direction and vibration in the Z direction may be performed simultaneously in order for the vibration to be felt as if the vibration is in the gravity direction by combination. Also in this case, by increasing the driving force for the vibrating element 115, the damping due to the influence of gravity may be compensated.

When a plurality of vibration directions is combined, the operation panel state detector may, for example, linearly detect the orientation (the tilt angle and the rotation angle), and the vibration controller 114 may linearly change the combination of the driving ratios of the plurality of vibration directions according to the detection result of the direction to increase the driving force in the gravity direction.

In addition, each of the above embodiments describes, as an example, that the operation panel unit included in the image forming device that is a stationary machine is vibrated. Furthermore, similar configurations and control processing may be applied in a case where the operation panel that is an input device of any other stationary machine is vibrated.

Although embodiments of the present invention have been described and illustrated in detail, the disclosed embodiments are made for purposes of illustration and example only and not limitation. The scope of the present invention should be interpreted by terms of the appended claims.

DESCRIPTION OF REFERENCE NUMERALS

100 . . . Image forming device
101 . . . Paper cassette
102 . . . Image former
103 . . . Paper discharger
104 . . . Document reader
105 . . . Lighting unit
106 . . . Operation panel holding frame
107 . . . Vibration absorbing member
110 . . . Operation panel unit
111 . . . Central processing unit (CPU)
114 . . . Vibration controller
115 . . . Vibrating element
116 . . . Storage
117 . . . Touch panel
118 . . . Liquid crystal display panel
120 . . . Controller
121 . . . Central processing unit (CPU)
122 . . . Drawing unit
123 . . . Image reader
124 . . . Image processor
125 . . . Image output unit
126 . . . Lighting controller
127 . . . ROM
128 . . . RAM
129 . . . Hard disk drive (HDD)
130 . . . Network interface

The invention claimed is:

1. An operation input device that causes a vibrating element to vibrate an operation panel attached to a device main body to notify a user when detecting an operation of the operation panel by the user, the operation input device comprising:
  a storage that stores information on at least a plurality of vibration directions as a vibration drive condition for causing the vibrating element to vibrate;
  a vibration controller that selects at least one vibration direction from among the plurality of vibration directions stored in the storage, based on a state of the operation input device, and drives the vibrating element in a corresponding direction when detecting an operation input from the operation panel; and
  a user authenticator that identifies or authenticates the user,
  wherein the storage stores a vibration direction in association with each user registered in advance by the user authenticator, the vibration controller reads a vibration direction corresponding to the user identified or authenticated by the user authenticator, and the vibration controller drives the vibrating element in the corresponding direction.

2. An operation input device that causes a vibrating element to vibrate an operation panel attached to a device main body to notify a user when detecting an operation of the operation panel by the user, the operation input device comprising:
  a storage that stores information on at least a plurality of vibration directions as a vibration drive condition for causing the vibrating element to vibrate;
  a vibration controller that selects at least one vibration direction from among the plurality of vibration directions stored in the storage, based on a state of the operation input device, and drives the vibrating element in a corresponding direction when detecting an operation input from the operation panel; and
  a display controller that controls an operation image to be displayed on the operation panel,
  wherein the storage stores a vibration direction in association with the operation image to be displayed by the display controller, the vibration controller reads a vibration direction corresponding to the operation image to be displayed by the display controller, and the vibration controller drives the vibrating element in the corresponding direction.

3. An operation input device that causes a vibrating element to vibrate an operation panel attached to a device main body to notify a user when detecting an operation of the operation panel by the user, the operation input device comprising:
  a storage that stores information on at least a plurality of vibration directions as a vibration drive condition for causing the vibrating element to vibrate;
  a vibration controller that selects at least one vibration direction from among the plurality of vibration directions stored in the storage, based on a state of the operation input device, and drives the vibrating element in a corresponding direction when detecting an operation input from the operation panel;
  an operation panel holder that changes an operation surface of the operation panel to a plurality of orientations and fixes the operation panel to a device main body; and
  an operation panel state detector that detects an orientation of the operation panel,
  wherein the vibration controller determines, according to the orientation of the operation panel detected by the operation panel state detector, the vibration direction to drive the vibrating element.

4. The operation input device according to claim 3, wherein
  the vibration controller selects and drives at least one of the plurality of vibration directions according to a detection result by the operation panel state detector.

5. The operation input device according to claim 4, wherein
  the vibration controller selects and drives a direction different from a gravity direction of the operation surface of the operation panel as the vibration direction according to a detection result by the operation panel state detector.

6. The operation input device according to claim 3, wherein the vibration controller changes a driving ratio of the plurality of vibration directions according to a detection result by the operation panel state detector.

7. The operation input device according to claim 6, wherein the driving ratio is a ratio in which a driving force for vibration in the same direction as a gravity direction of the operation surface of the operation panel is increased.

8. The operation input device according to claim 6, wherein the operation panel state detector linearly detects the orientation of the operation panel, and the vibration controller increases a driving force in a gravity direction of the operation surface of the operation panel by combining driving ratios of the plurality of vibration directions according to a detection result of the orientation of the operation panel.

9. The operation input device according to claim 3, further comprising a vibrating element changer that changes the vibration direction of the vibrating element,
  wherein the vibration controller causes the vibrating element changer to change the vibration direction of the vibrating element according to a detection result by the operation panel state detector.

10. An image forming device that causes a vibrating element to vibrate an operation panel attached to a device main body that forms an image on a medium to notify a user when detecting an operation of the operation panel by the user, the image forming device comprising:
  a storage that stores information on at least a plurality of vibration directions as a vibration drive condition for causing the vibrating element to vibrate;
  a vibration controller that selects at least one vibration direction from among the plurality of vibration directions stored in the storage, based on a state of the image forming device, and drives the vibrating element in a corresponding direction when detecting an operation input from the operation panel; and
  a user authenticator that identifies or authenticates the user,
  wherein the storage stores a vibration direction in association with each user registered in advance by the user authenticator, the vibration controller reads a vibration direction corresponding to the user identified or authenticated by the user authenticator, and the vibration controller drives the vibrating element in the corresponding direction.

11. An image forming device that causes a vibrating element to vibrate an operation panel attached to a device main body that forms an image on a medium to notify a user when detecting an operation of the operation panel by the user, the image forming device comprising:

a storage that stores information on at least a plurality of vibration directions as a vibration drive condition for causing the vibrating element to vibrate;

a vibration controller that selects at least one vibration direction from among the plurality of vibration directions stored in the storage, based on a state of the image forming device, and drives the vibrating element in a corresponding direction when detecting an operation input from the operation panel; and a display controller that controls an operation image to be displayed on the operation panel, wherein the storage stores a vibration direction in association with the operation image to be displayed by the display controller, the vibration controller reads a vibration direction corresponding to the operation image to be displayed by the display controller, and the vibration controller drives the vibrating element in the corresponding direction.

12. An image forming device that causes a vibrating element to vibrate an operation panel attached to a device main body that forms an image on a medium to notify a user when detecting an operation of the operation panel by the user, the image forming device comprising:

a storage that stores information on at least a plurality of vibration directions as a vibration drive condition for causing the vibrating element to vibrate;

a vibration controller that selects at least one vibration direction from among the plurality of vibration directions stored in the storage, based on a state of the image forming device, and drives the vibrating element in a corresponding direction when detecting an operation input from the operation panel;

an operation panel holder that changes an operation surface of the operation panel to a plurality of orientations and fixes the operation panel to a device main body; and an operation panel state detector that detects an orientation of the operation panel, wherein the vibration controller determines, according to the orientation of the operation panel detected by the operation panel state detector, the vibration direction to drive the vibrating element.

* * * * *